(12) United States Patent
Washizawa et al.

(10) Patent No.: US 8,126,698 B2
(45) Date of Patent: Feb. 28, 2012

(54) TECHNIQUE FOR IMPROVING ACCURACY OF MACHINE TRANSLATION

(75) Inventors: Masahide Washizawa, Kanagawa-ken (JP); Tomohiro Miyahira, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/923,051

(22) Filed: Oct. 24, 2007

(65) Prior Publication Data

US 2008/0103757 A1 May 1, 2008

(30) Foreign Application Priority Data

Oct. 27, 2006 (JP) ................................. 2006-292761

(51) Int. Cl.
G06F 17/28 (2006.01)
G06F 17/20 (2006.01)
(52) U.S. Cl. ..................................... 704/2; 704/4; 704/8
(58) Field of Classification Search .................. 704/2, 7, 704/8
See application file for complete search history.

(56) References Cited

U.S. PATENT DOCUMENTS

| | | | | |
|---|---|---|---|---|
| 4,931,936 A | * | 6/1990 | Kugimiya et al. | 704/4 |
| 5,161,105 A | * | 11/1992 | Kugimiya et al. | 704/4 |
| 5,477,450 A | * | 12/1995 | Takeda et al. | 704/2 |
| 5,640,575 A | * | 6/1997 | Maruyama et al. | 704/4 |
| 5,895,446 A | * | 4/1999 | Takeda et al. | 704/2 |
| 5,978,754 A | * | 11/1999 | Kumano | 704/3 |
| 6,119,077 A | * | 9/2000 | Shinozaki | 704/3 |
| 6,182,027 B1 | * | 1/2001 | Nasukawa et al. | 704/2 |
| 7,587,254 B2 | * | 9/2009 | Kirkeby et al. | 700/94 |
| 7,912,696 B1 | * | 3/2011 | Asano et al. | 704/2 |
| 2001/0029443 A1 | * | 10/2001 | Miyahira | 704/7 |
| 2004/0230418 A1 | * | 11/2004 | Kitamura | 704/8 |
| 2005/0273316 A1 | * | 12/2005 | Izuha | 704/9 |
| 2006/0217963 A1 | * | 9/2006 | Masuichi et al. | 704/7 |
| 2007/0027670 A1 | * | 2/2007 | Verhey-Henke et al. | 704/2 |
| 2008/0059146 A1 | * | 3/2008 | Liu | 704/2 |

FOREIGN PATENT DOCUMENTS

| | | |
|---|---|---|
| JP | 04-323770 | 11/1992 |
| JP | 06-332936 | 12/1994 |
| JP | 07-007419 | 1/1995 |

(Continued)

*Primary Examiner* — Richemond Dorvil
*Assistant Examiner* — Olujimi Adesanya
(74) *Attorney, Agent, or Firm* — Novak Druce + Quigg LLP

(57) ABSTRACT

A system for translating messages is provided. The system includes a parsing unit that parses a first message and a second message in which the same content is respectively described in a first language and a second language that are different from each other so as to generate a first syntactic tree that represents the structure of the first message and a second syntactic tree that represents the structure of the second message, a determining unit that, in a case where the representation of a phrase represented by a certain subtree included in the first syntactic tree matches the representation of a phrase represented by a subtree, corresponding to the subtree, in the second syntactic tree, determines that the phrase is a phrase that need not be translated, and a translation unit that, in a process of generating a fourth message described in a fourth language by translating a third message described in a third language, outputs the phrase that need not be translated and is included in the third message, as represented in the third message, the phrase being put in the fourth message after the translation.

17 Claims, 11 Drawing Sheets

FOREIGN PATENT DOCUMENTS

| | | |
|---|---|---|
| JP | 08-202720 | 8/1996 |
| JP | 11-045245 | 2/1999 |
| JP | 11-272670 | 10/1999 |
| JP | 2003-141114 | 5/2003 |
| JP | 2003-196274 | 7/2003 |
| JP | 2004-178423 | 6/2004 |
| JP | 2004-310170 | 11/2004 |
| JP | 2004-355322 | 12/2004 |

* cited by examiner

FIG. 7
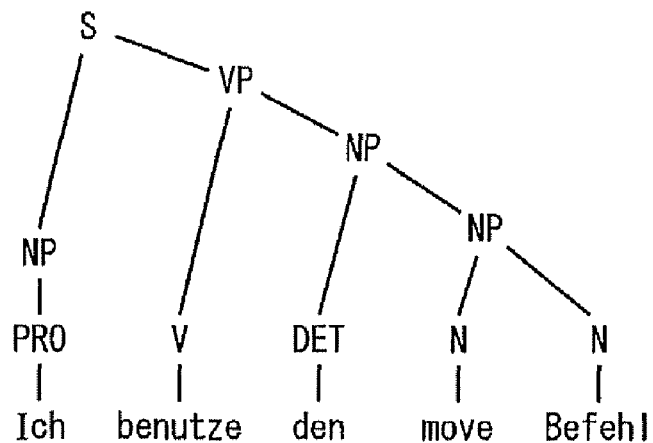
FIG. 8
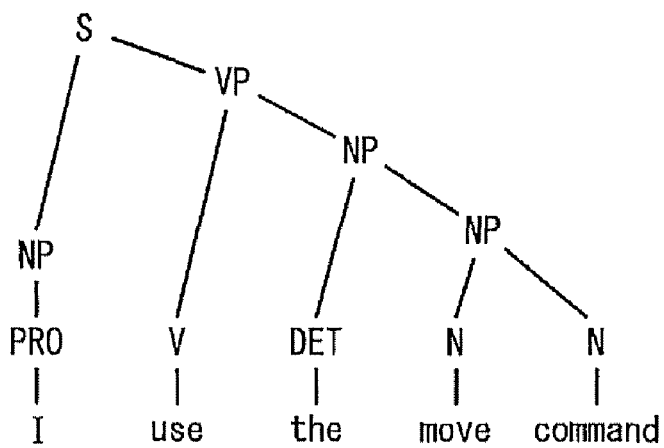
FIG. 9
| ENGLISH | GERMAN |
|---|---|
| I | Ich |
| move command | move Befehl |
| move | move |
| command | Befehl |

FIG. 12

(ENGLISH) Everyplace Access is based on open industry standards such as XML.

(GERMAN) Everyplace Access basiert auf offenen Industrie-standards wie XML.

FIG. 13a 540 (ENGLISH)

| ENGLISH | SEMANTIC ATTRIBUTE | TRANSLATION |
|---|---|---|
| command | eACT (ACT) | 命令 |
| | eSTATE (STATE) | 見晴らし |

540 (JAPANESE)

FIG. 13b

| GERMAN | SEMANTIC ATTRIBUTE |
|---|---|
| Befehl | eACT (ACT) |
| (Sicht : command) | eSTATE (STATE) |

540 (GERMAN)

FIG. 14a

| ENGLISH | SEMANTIC ATTRIBUTE | GERMAN | JAPANESE |
|---|---|---|---|
| case | eABST(ABSTRACT) | Fall | 事例 |
|  | eDEV(ARTIFACT) | Kiste | 箱 |

FIG. 14b

| ENGLISH | SEMANTIC ATTRIBUTE | GERMAN | JAPANESE |
|---|---|---|---|
| table | eLANG(LANGUAGE) | Tabelle | 表 |
|  | eDEV(ARTIFACT) | Tisch | テーブル |

FIG. 14c

| ENGLISH | SEMANTIC ATTRIBUTE | GERMAN | JAPANESE |
|---|---|---|---|
| plant | ePLANT(PLANT) | Pflanze | 植物 |
|  | ePLACE(PLACE) | Fabrik | 工場 |

FIG. 14d

| ENGLISH | SEMANTIC ATTRIBUTE | GERMAN | CHINESE | JAPANESE |
|---|---|---|---|---|
| right | ePLACE(PLACE) | Recht | 右方 | 右 |
|  | eLAW(LAW) | Recht | 权利 | 権利 |

TECHNIQUE FOR IMPROVING ACCURACY OF MACHINE TRANSLATION

CROSS-REFERENCE TO RELATED APPLICATION

This application claims the benefit of Japanese Application No. 2006-292761, filed Oct. 27, 2006.

FIELD OF THE INVENTION

The present invention relates to techniques for improving the accuracy of machine translation, and more specifically, the present invention relates to a technique for improving the accuracy of machine translation using messages that have been already translated.

BACKGROUND OF THE INVENTION

Recently, a high level of efficiency in the development of open source software has attracted attention, and various types of such software have been developed. In many cases, a high priority is given to the function expansion, stabilization, and the like in the development of open source software. Messages that indicate the execution state of such software, for example, error messages and help messages, may be displayed in only one language, such as English, thereby resulting in inconvenience for non-native users of English.

In the context of translating messages from one language to another, reference is made to Japanese Unexamined Patent Application Publication No. 2003-141114, mentioned below, as an example of a technique in which, when texts are translated, other texts that have been already translated are used.

SUMMARY OF THE INVENTION

The present invention is directed to a system, methods, and computer-program product for translating messages. According to one aspect of the invention, a system for translating messages can include a message storage unit for storing a first message and a second message in which the same content is respectively described in a first language and a second language that are different from each other. The system also can include a parsing unit for generating a first syntactic tree that represents a hierarchical structure of words and phrases included in the first message and a second syntactic tree that represents a hierarchical structure of words and phrases included in the second message, generated by an operation of a CPU, by reading the first and second messages from the message storage unit, and parsing the first and second messages.

The system further can include a determining unit for determining, by the operation of the CPU, whether a representation of a phrase represented by a certain subtree included in the first syntactic tree matches a representation of a phrase represented by a subtree, corresponding to the certain subtree, in the second syntactic tree. On the condition that the representations match each other, the determining unit can determine that the phrase is a phrase that need not be translated. Additionally, the system can include a translation unit for outputting, in a process of generating a fourth message described in a fourth language by translating a third message described in a third language by the operation of the CPU, the phrase that need not be translated and is included in the third message, the phrase being put in the fourth message after the translation.

In another aspect of the invention, a method for translating messages is provided. In still another aspect, a computer-program product for causing an information processing unit to translate messages is provided.

BRIEF DESCRIPTION OF THE DRAWINGS

There are shown in the drawings, embodiments which are presently preferred. It is expressly noted, however, that the invention is not limited to the precise arrangements and instrumentalities shown.

FIG. 7 is a schematic view of an exemplary second syntactic tree obtained by parsing a second message, according to an embodiment of the invention.

FIG. 8 is a schematic view of an exemplary first syntactic tree obtained by parsing a first message, according to an embodiment of the invention.

FIG. 9 is a schematic view of exemplary correspondences between phrases in first and second languages.

FIG. 12 shows a specific example of a compound word that need not be translated.

FIG. 13a is a schematic view of specific examples of semantic attributes of English.

FIG. 13b is a schematic view of specific examples of semantic attributes of German.

FIG. 14a is a schematic view of specific examples of semantic attributes of an English word "case".

FIG. 14b is a schematic view of specific examples of semantic attributes of an English word "table".

FIG. 14c is a schematic view of specific examples of semantic attributes of an English word "plant".

FIG. 14d is a schematic view of specific examples of semantic attributes of an English word "right".

REFERENCE NUMERALS IN THE FIGURES

Figure 1:
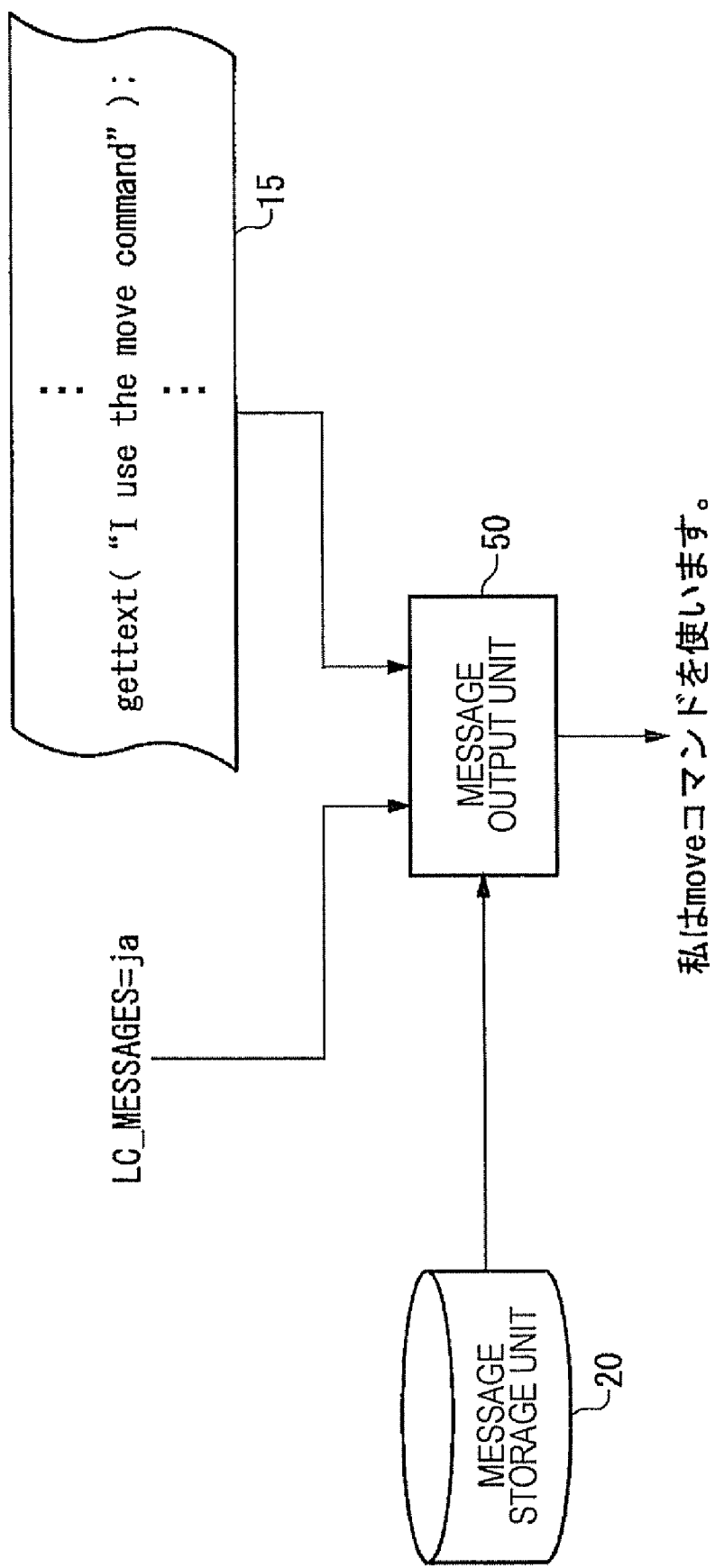
FIG. 1 is a schematic view of the structure of an information system 10, according to an embodiment of the invention.

10: information system
15: application program
20: message storage unit
50: message output unit
300: message file
400: message file

500: parsing unit
510: language storage unit
520: determining unit
530: translation unit
540: attribute storage unit
1500: information processing unit

DETAILED DESCRIPTION

Operating systems, such as Linux (registered trademark), have a function for selectively displaying messages in which the same content is described in different languages so as to display a message in a language that is suitable for a particular user. In order to effectively use this function, messages need to be defined in advance for different languages. However, in some software, messages other than English messages are not provided at all. Even when messages other than English messages are provided, in many cases, only messages in very limited languages are provided. In these cases, messages that are prepared in advance may be translated by machine translation. However, a highly accurate translation is needed to translate short messages such as error messages so that the meanings can be understood. Thus, machine translation of messages has not been attempted. Accordingly, it is an object of the present invention to provide a system, a method, and a computer-program product in which the aforementioned problems can be solved. The object is achieved by combinations of features described in independent claims. Moreover, dependent claims define additional advantageous concrete examples of the present invention.

To solve the aforementioned problems, in an aspect of the present invention, a system for translating messages is provided. The system includes a message storage unit for storing a first message and a second message in which the same content is respectively described in a first language and a second language that are different from each other, a parsing unit for generating a first syntactic tree that represents a hierarchical structure of words and phrases included in the first message and a second syntactic tree that represents a hierarchical structure of words and phrases included in the second message by an operation of a CPU, by reading the first and second messages from the message storage unit and parsing the first and second messages, a determining unit for determining by the operation of the CPU whether a representation of a phrase represented by a certain subtree included in the first syntactic tree matches a representation of a phrase represented by a subtree, corresponding to the certain subtree, in the second syntactic tree, and, on the condition that the representations match each other, determining that the phrase is a phrase that need not be translated, and a translation unit for outputting, in a process of generating a fourth message described in a fourth language by translating a third message described in a third language by the operation of the CPU, the phrase that need not be translated and is included in the third message, as represented in the third message, the phrase being put in the fourth message after the translation. Moreover, a method for translating messages using the system and a computer-program product for causing an information processing unit to function as the system are provided.

The aforementioned outline of the invention does not include all combinations of features of the present invention. Moreover, sub-combinations of the feature groups may constitute the invention.

A Best Mode for Carrying Out the Invention

The present invention will now be described in terms of a best mode for carrying out the invention (hereinafter called an embodiment). The following embodiment does not restrict the invention claimed in the claims. Moreover, all combinations of features described in the embodiment are not necessarily mandatory for the problem-solving techniques provided by the invention.

FIG. 1 shows the overall structure of an information system 10. The information system 10 includes a message storage unit 20 and a message output unit 50. An object of the information system 10 is to translate messages (for example, error messages) from commands into a specified language and output the translated messages. The message storage unit 20 stores a plurality of messages in which the same content is described in a plurality of different languages. An application program 15 is executed by calling the message output unit 50. The application program 15 includes an instruction for outputting messages, for example, when an error occurs. This instruction is, for example, the gettext library function in the UNIX (registered trademark) family of operating systems, such as Linux (registered trademark). When this library function is invoked, the message output unit 50 attempts to output a specified message ("I use the move command") in a language (ja: indicating Japanese) preset in, for example, an environment variable (LC_MESSAGES).

Specifically, the message output unit 50 retrieves the message in the language from the message storage unit 20. Then, when the message has been successfully retrieved, the message output unit 50 outputs the retrieved message. When the message has not been successfully retrieved, the message output unit 50 generates a Japanese message by translating the English message by machine translation and outputs the Japanese message. The output message is preferably that in which Japanese words and a command name in alphabets are mixed, for example, "Watashi Wa move command Wo Tsukai Masu." (a Japanese letter string meaning "I use the move command."). This is because, when a command name or the like is forced to be translated into Japanese, the meaning of the text may be difficult to understand. In this way, in many cases, a highly accurate translation is needed to translate short messages such as error messages so that the messages can be understood.

An object of the message output unit 50 according to the embodiment is to improve the accuracy of machine translation by reading messages that have been already translated into another language (other than Japanese and English, for example, German) from the message storage unit 20 and using the messages.

Figure 2:
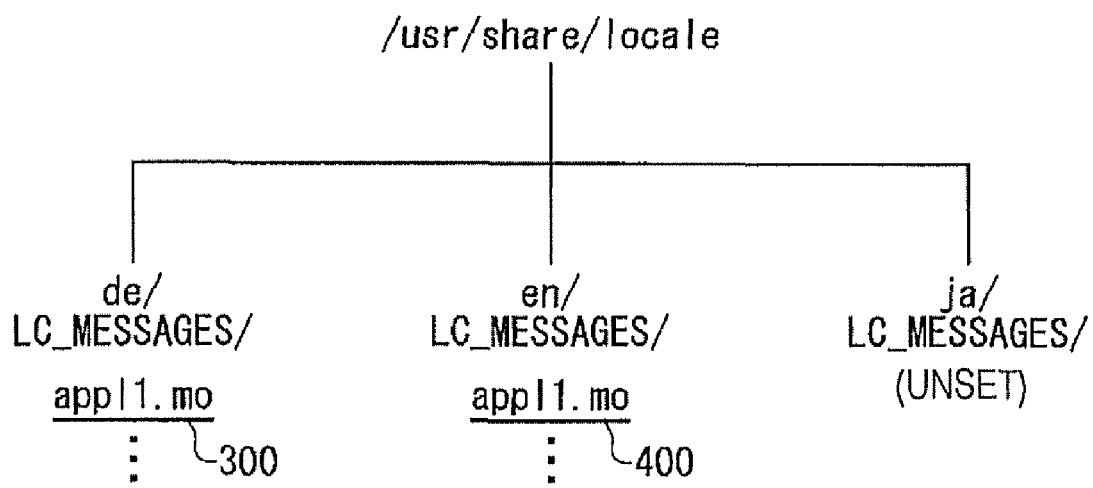
FIG. 2 is a schematic view an example of the structure of data in a message storage unit 20 of the information system 10.

FIG. 2 shows an example of the structure of data in the message storage unit 20. The message storage unit 20 stores a first message and a second message, in which the same content is respectively described in a first language (for example, English) and a second language (for example, German) that are different from each other. These messages are stored in a directory, the path name of which is /usr/share/locale/, in a file system of the message storage unit 20. The first message described in English is stored in a file in a directory, the path name of which is /usr/share/locale/en/LC_MESSAGES/. An example of such a file is a message file 400. The file name may be formed by, for example, appending an extension (mo) indicating that messages are stored in the file to the name (for example, appl1) of an application program that issues an instruction to display the message.

Similarly, the second message described in German is stored in a file in a directory, the path name of which is /usr/share/locale/de/LC_MESSAGES/. An example of such a file is a message file 300. The file name may be formed by, for example, appending an extension (mo) indicating that messages are stored in the file to the name (for example, appl1) of an application program that issues an instruction to display the message. In this way, the message storage unit 20 stores each message indicating, for example, a result of processing a command in association with a language in which the message is described.

A usage example of the messages stored in this way is as follows: For example, in a case where German is set in the environment variable, when the application program (appl1) instructs the message output unit 50 to output a message, the message output unit 50 locates a file, the file name of which is the name (appl1) of the application program, out of a directory specified by a path name (/usr/share/locale/de/LC_MESSAGES/) corresponding to German. When the file is located, a message to be output is selected from the file according to identification information specified in the application program and is output.

A fourth message described in Japanese that is an example of a fourth language in the present invention should be stored in a file in a directory, the path name of which is /usr/share/locale/ja/LC_MESSAGES/. However, in FIG. 2, no file is stored in this directory. The state in which no file is stored indicates that messages described in the corresponding language are not prepared. In such a case, the message output unit 50 may retrieve and output a message in English that is the default language. However, non-native users of English may find such an English message inconvenient. Thus, it is preferable that the message output unit 50 translate the messages in English and German, which already have been prepared, into a Japanese message by machine translation and output the Japanese message.

However, a message in English, which is the default language, may not be stored in the message storage unit 20 in advance and may be specified, in the application program 15, as a message to be output. For example, according to the specification of the aforementioned gettext library function, a message to be output is not specified with a number, a symbol, or the like and is specified with the character string of an English message to be output in a case where a message in a language set in the environment variable cannot be located. In such a case, an English message may not be stored in the message storage unit 20 in advance. That is, when an English message is output, in a process of executing the application program 15 by calling the message output unit 50, a message specified as an argument of the gettext library function in the application program 15 is obtained and stored in a RAM 1020 (hereinafter called a memory) described below, and is output to a screen without change.

Figure 3:
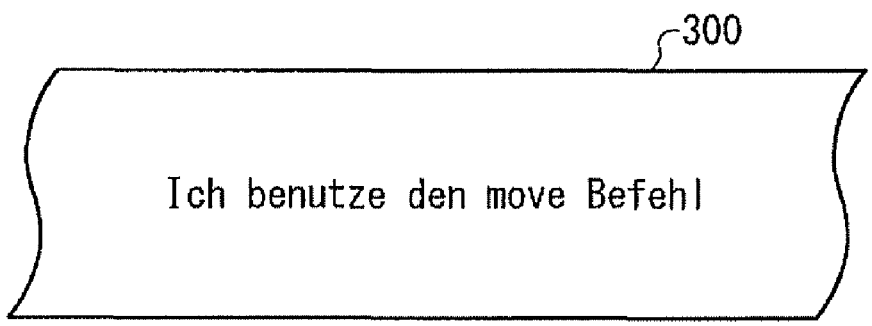
FIG. 3 shows an example of the content of a message file 300.

FIG. 3 shows an example of the content of the message file 300. The message file 300 stores each piece of identification information of a result of processing a command in association with a message indicating the result of processing the command. Identification information may be a number, a symbol, or the like. Alternatively, identification information may be the character string of an English message to be output in a case where a message in a language set in the environment variable cannot be located, as described above. That is to say, FIG. 3 shows a German message "Ich benutze den move Befehl" corresponding to identification information "I use the move command", or a number or a symbol indicating the identification information.

Figure 4:
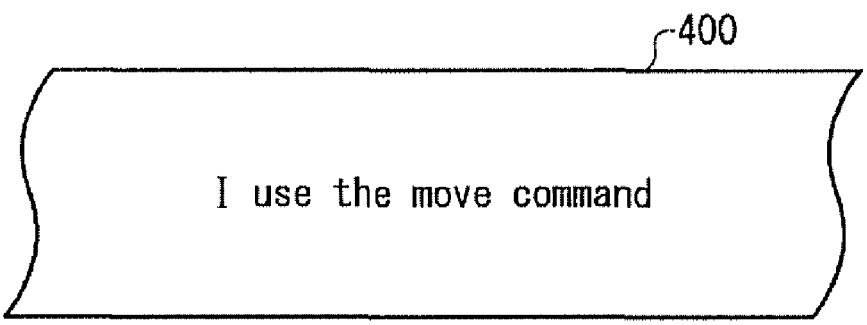
FIG. 4 shows an example of the content of a message file 400.

FIG. 4 shows an example of the content of the message file 400. The message file 400 is similar to the message file 300 shown in FIG. 3. That is to say, each piece of identification information of a result of processing a command is stored in association with a message indicating the result of processing the command. English messages may not be stored as a file in the message storage unit 20 in advance, as described above.

Figure 5:
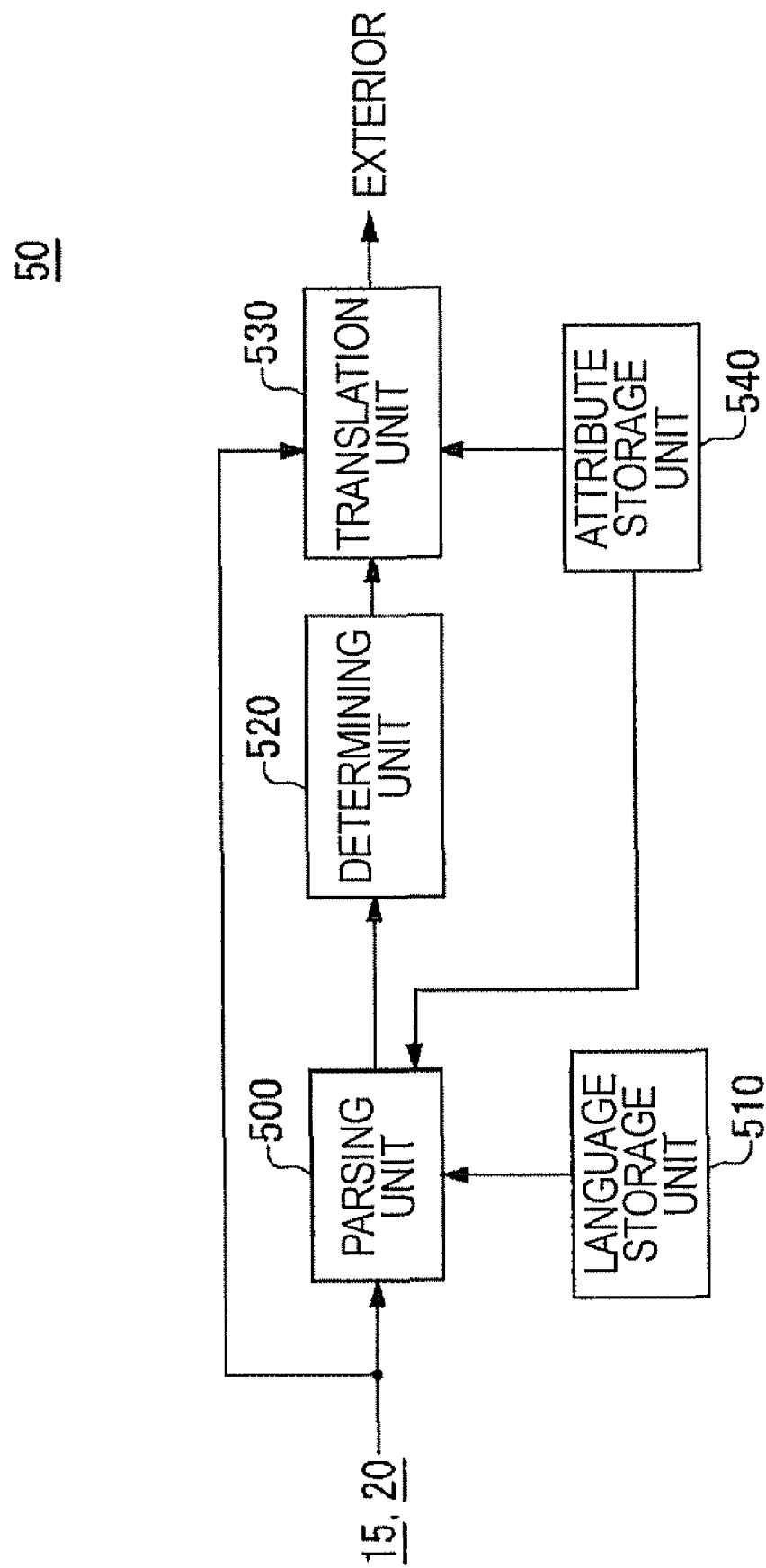
FIG. 5 is a schematic view the functional structure of a message output unit 50 of the information system 10.

FIG. 5 shows the functional structure of the message output unit 50. The message output unit 50 functions as a parsing unit 500, a language storage unit 510, a determining unit 520, a translation unit 530, and an attribute storage unit 540 by reading a program from, for example, a CD-ROM 1095 described below and executing the program to act on a CPU 1000 described below, the memory, and the like. (See FIG. 15.) In the parsing unit 500, the first and second messages are read from the message storage unit 20 or are supplied from the application program 15 in execution.

Then, the parsing unit 500 performs morphological analysis on the first and second messages, as necessary. Morphological analysis is a process of parsing a character string ultimately into words, determining the part of speech of each of the words by the operation of the CPU 1000, and storing each of the words in the memory in association with the part of speech. The specific process of morphological analysis depends on the language of a message to be processed. This is because, in a language such as English, breaks between words are clear without analysis, and in contrast, in another language such as Japanese, breaks between words cannot be determined without analysis. Thus, the parsing unit 500 needs to perform necessary morphological analyses on the first and second messages, respectively, depending on the first and second languages. The parsing unit 500 parses the first and second messages so as to generate a first syntactic tree that represents the hierarchical structure of words and phrases included in the first message and a second syntactic tree that represents the hierarchical structure of words and phrases included in the second message by the operation of the CPU 1000 and stores the first and second syntactic trees in the memory.

The determining unit 520 determines by the operation of the CPU 1000 whether the representation of a phrase represented by a certain subtree included in the first syntactic tree matches the representation of a phrase represented by a subtree, corresponding to the subtree, in the second syntactic tree. For example, in a case where both the first and second syntactic trees represent sentences, each of which includes a noun phrase, a verb, and a noun phrase (corresponding to an object), it is determined whether the representations of the noun phrases corresponding to the objects in the first and second messages match each other. On the condition that the representations match each other, the determining unit 520 determines that the phrase, the representation of which matches the representation of the other phrase, is a phrase that need not be translated. This is because the probability that such a phrase is a proper noun or a technical term is high, and thus, in many cases, even when the phrase is not translated (or rather when the phrase is not translated), the phrase can be understood. A subtree of a syntactic tree here includes not only that which is formed of a plurality of words but also that which is formed of a single word. Moreover, a match includes not only an exact match but also a close match. For example, concerning a phrase that includes two words, the difference only between the presence and the absence of a hyphen, the difference only between the presence and the absence of an underline, and the difference only between upper and lower cases are considered as a match. As an example, "POP server" and "POP-server" are considered to match each other.

The translation unit 530 reads a third message described in a third language from the message storage unit 20 and translates the third message into the fourth language (a target language, for example, Japanese). The third language here may be the same as one of the first and second languages or may be a language different from both the first and second languages. However, since the third language need not be translated when the third language is the same as the fourth language, the third language is assumed to be a language other than the fourth language. Moreover, the fourth language is a language different from all of the first, second, and third languages. This is because translation is not necessary when the fourth language is the same as any one of the first, second, and third languages. Hereinafter, the description is given, assuming that the first and third languages are English, the second language is German, and the fourth language is Japanese.

In the process of generating the fourth message by translating the third message by the operation of the CPU 1000, the translation unit 530 determines whether any phrase that need not be subjected to the translation is included in the third message. When the translation unit 530 determines that such a phrase is included in the third message, the translation unit 530 puts the phrase that need not be translated in the fourth message after the translation and outputs the phrase, as represented in the third message. That is, in the fourth message, a proper noun, a command name, and the like that are determined using the first and second messages are output without the representations being changed. In this way, in the message output unit 50, a phrase that need not be translated is appropriately detected and can be used to improve the accuracy of machine translation.

In order to further improve the accuracy of translation, it is preferable that the message output unit 50 further use information stored in the language storage unit 510 and the attribute storage unit 540. The attribute storage unit 540 stores, for each language, the individual representations of a plurality of words in association with semantic attributes about individual meanings of the words. A semantic attribute here indicates which one of the groups, into which meanings of words are classified according to the abstraction of each of the meanings, the meaning of a word belongs to. For example, a semantic attribute indicates whether a word having a certain representation is a verb and the meaning shows an 'act', or the word having the representation is also a noun and the meaning shows a 'state'.

The language storage unit 510 stores languages classified into groups. Only similar languages are stored in each of the groups. For example, individual languages may be classified into groups according to the classification of languages called a language family, such as the Indo-European language family or the Afro-Asiatic language family. Alternatively, individual languages may be classified into groups according to an area, a race, or the like in which the individual languages are used. Needless to say, since the language storage unit 510 is implemented using the memory and the like, storing a language means storing certain information with which the language can be identified. The parsing unit 500 and the translation unit 530 may perform an additional process using these pieces of information to improve the accuracy of translation. The details are described more particularly below.

Figure 6:
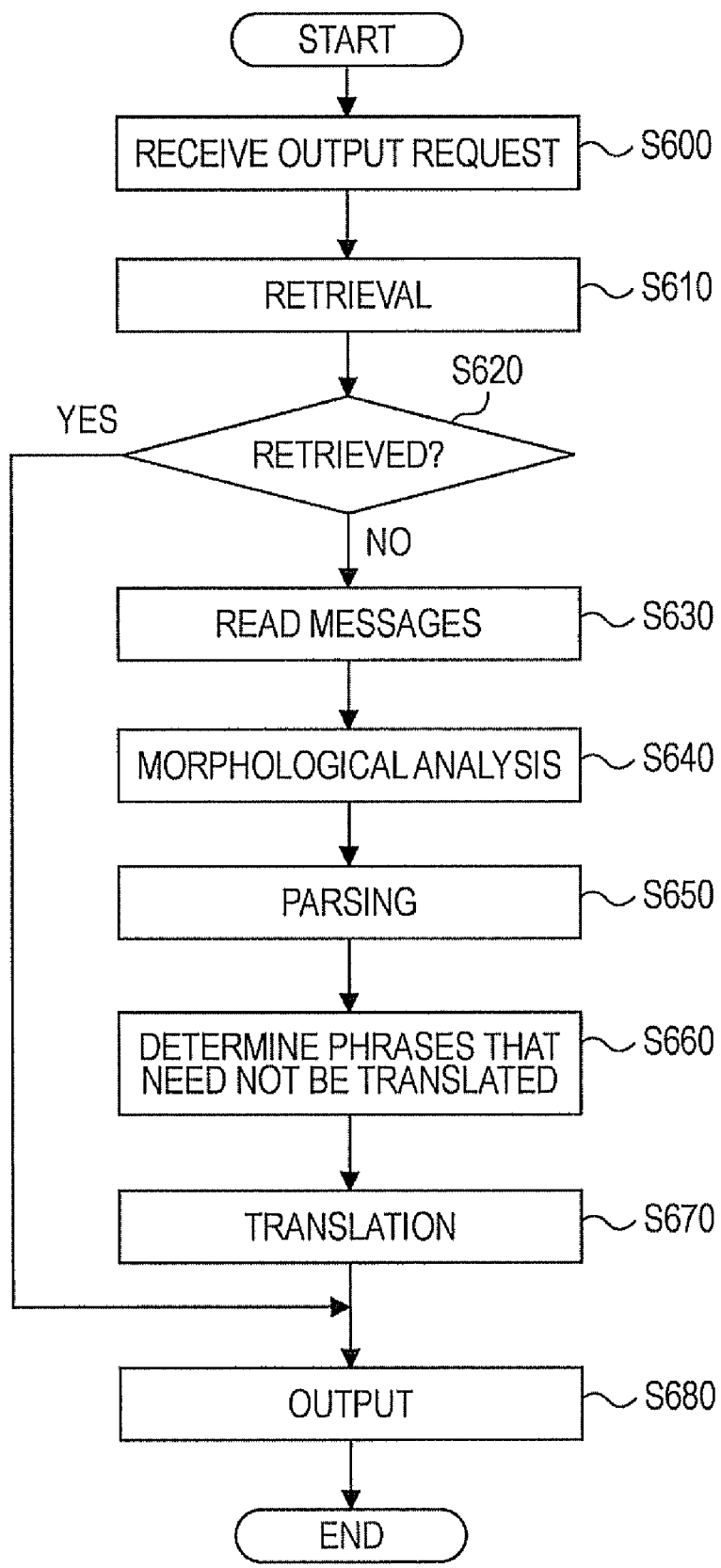
FIG. 6 is a flowchart of exemplary steps in a process in which the information system 10 outputs a message, according to an embodiment of the invention.

FIG. 6 shows a flowchart of a process in which the information system 10 outputs a message. The parsing unit 500 receives a request to output a message indicating a result of processing a command in the fourth language by a library function from the application program 15 and the like (S600). A type of message that is requested to be output is given by an argument of a library function, and what language the fourth language is given by the environment variable and the like, as described above. The parsing unit 500 retrieves the fourth message corresponding to the fourth language and the identification information of the result of the processing from the message storage unit 20 (S610). On the condition that the fourth message has been successfully retrieved (S620: YES), the translation unit 530 outputs the retrieved fourth message and completes the process (S680).

On the condition that the fourth message has not been successfully retrieved (S620: NO), the parsing unit 500 searches for and reads a plurality of messages corresponding to a plurality of languages different from the fourth language out of the message storage unit 20 as the first and second messages (S630). Messages to be searched for are, for example, an English message and a German message. Moreover, when messages in more than two languages can be retrieved, the parsing unit 500 may read the individual messages from the message storage unit 20. In a case where messages in more than one language are not read from the message storage unit 20 or a case where no message in one or more other languages has been read from the message storage unit 20, when an English message is given in the application program 15, the technique of the present invention for improving the accuracy of translation is not used, and machine translation from the third language (English) to the fourth language (Japanese) is performed by a known machine translation technique, and a message is displayed.

Then, the parsing unit 500 performs necessary morphological analyses on the individual read messages (S640). Then, the parsing unit 500 generates a plurality of syntactic trees by parsing the individual messages (S650). Specific examples of a syntactic tree are shown in FIGS. 7 and 8.

FIG. 7 shows an example of the second syntactic tree obtained by parsing the second message. The bottom line shows the second message. The information of parts of speech shown in the second line from the bottom can be obtained by morphological analysis. That is to say, "Ich" is a pronoun (PRO: pronoun), "benutze" is a verb (V: verb), "den" is a determiner (DET: determinant), and "move" and "Befehl" are nouns (N: noun). The information of other parts can be obtained by parsing. That is to say, "move" and "Befehl" constitute a noun phrase (NP: Noun Phrase). Moreover, the noun phrase and "den" constitute a noun phrase including them. Moreover, the noun phrase and "benutze" constitute a verb phrase (VP: Verb Phrase). Moreover, a noun phrase that includes only "Ich" that is a pronoun and the verb phrase constitute a sentence (S: sentence).

FIG. 8 shows an example of the first syntactic tree obtained by parsing the first message. The bottom line shows the first message. The information of parts of speech shown in the second line from the bottom can be obtained by morphological analysis. That is to say, "I" is a pronoun (PRO: pronoun), "use" is a verb (V: verb), "the" is a determiner (DET: determinant), and "move" and "command" are nouns (N: noun). The information of other parts can be obtained by parsing. That is to say, "move" and "command" constitute a noun phrase (NP: Noun Phrase). Moreover, the noun phrase and "the" constitute a noun phrase including them. Moreover, the noun phrase and "use" constitute a verb phrase (VP: Verb Phrase). Moreover, a noun phrase that includes only "I" that is a pronoun and the verb phrase constitute a sentence (S: sentence).

Returning to FIG. 6, the determining unit 520 determines by the operation of the CPU 1000 whether the representation of a phrase represented by a certain subtree included in the first syntactic tree matches the representation of a phrase represented by a subtree, corresponding to the subtree, in the second syntactic tree (S660). It is preferable that this determination be not made for all subtrees in a syntactic tree but be made only for subtrees each of which includes a sequence of one or more unknown words. An unknown word is a word that is not registered in a dictionary for translation and thus cannot be translated. The process can be made more efficient by reducing a necessary process by limiting objects subjected to determination to unknown words in this way. Moreover, in this arrangement, when words having the same spelling exist in the first and second languages, the determining unit 520 can be prevented from erroneously determining that the words match each other. Then, on the condition that the representations match each other, the determining unit 520 determines that the phrase is a phrase that need not be translated. This process will now be described with reference to FIGS. 9 to 11.

FIG. 9 shows correspondences between phrases in the first and second languages. The hierarchical structures of the first and second syntactic trees exactly match each other except for the representations at the bottom lines, as evidenced by comparison between the first and second syntactic trees respectively shown in FIGS. 7 and 8. Thus, the determining unit 520 can locate a subtree, corresponding to a certain subtree in the first syntactic tree, out of the second syntactic tree by scanning each of the syntactic trees. For example, a subtree that includes only "I" in English corresponds to a subtree that includes only "Ich" in German. Moreover, a subtree that includes the noun "move" and the noun "command" in English corresponds to a subtree that includes the noun "move" and the noun "Befehl" in German.

Moreover, a subtree that includes only the noun "move" in English corresponds to a subtree that includes only the noun "move" in German. Moreover, these representations match each other. Moreover, a subtree that includes only the noun "command" in English corresponds to a subtree that includes only the noun "Befehl" in German. In a case where the structures of syntactic trees exactly match each other, as described above, in order to locate a subtree corresponding to each subtree in one syntactic tree out of the other syntactic tree, the determining unit 520 merely needs to scan the other syntactic tree. A case where the structures of syntactic trees are different will now be described. In this case, transfer rules used in machine translation are used. In many cases, the structures of syntactic trees match each other between English and German. Thus, the description will continue with a case where syntactic trees are compared between English and Japanese being an example.

Figure 10A:
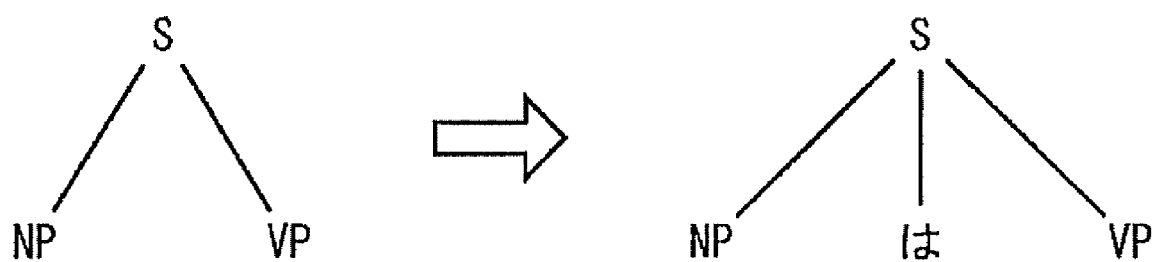
FIG. 10a is a schematic view of an exemplary transfer rule.

FIG. 10a shows an example of a transfer rule. The syntactic tree of an English message on the left of the drawing shows a sentence that includes a noun phrase and a verb phrase. The syntactic tree on the left of the drawing needs to be transformed into a syntactic tree on the right of the drawing so as to translate the English sentence into Japanese. The right of the drawing shows the syntactic tree of a corresponding Japanese sentence. In this syntactic tree, a noun phrase, a postpositional particle "Wa" (a Japanese letter string), and a verb phrase are shown in this order. That is, this rule shows that, in a case where English is translated into Japanese, when a sentence that includes a noun phrase and a verb phrase, for example, "I do", is given, translations "Watashi" (a Japanese letter string meaning "I") and "Suru" (a Japanese letter string meaning "do") are added as individual phrases, and transformation according to this rule is performed (that is, "Wa" (a Japanese letter string) is inserted between the noun phrase and the verb phrase). In this example, as a result of the translation, a message "Watashi Wa Suru" (a Japanese letter string meaning "I do") is generated.

Figure 10B:
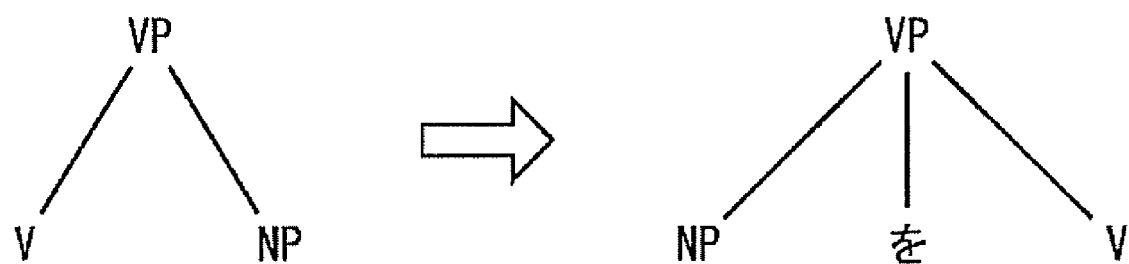
FIG. 10b is a schematic view of another exemplary transfer rule.

FIG. 10b shows another example of a transfer rule. The left and right of the drawing show an English syntactic tree and a Japanese syntactic tree after transformation, respectively, as in FIG. 10a. The details are as follows: The English syntactic tree is a verb phrase that includes a verb and a noun phrase in this order. The Japanese syntactic tree is a verb phrase that includes a noun phrase, a postpositional particle "Wo" (a Japanese letter string), and a verb in this order. That is, the drawing shows that, for example, an English message "have lunch" is transformed into a Japanese message "lunch Wo Taberu" (a Japanese letter string meaning "have lunch").

These transfer rules are merely illustrative examples. More detailed transfer rules can be provided.

Figure 11A:
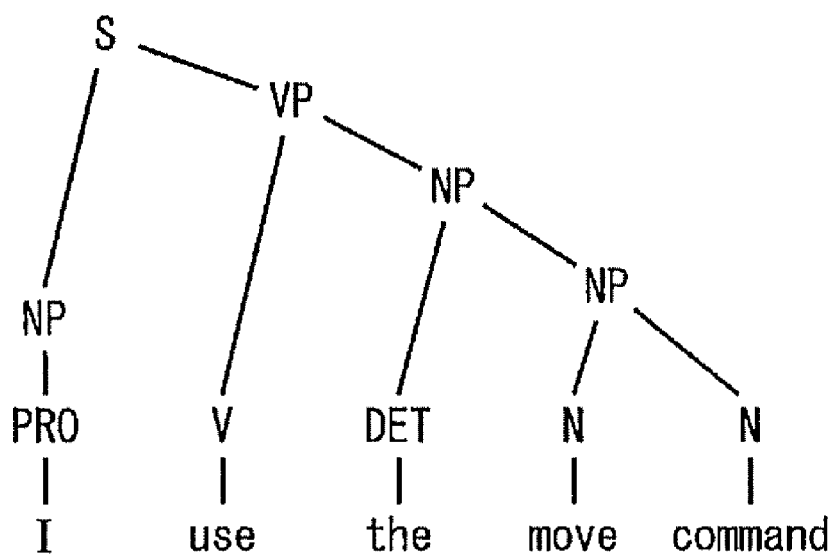
FIG. 11a is a schematic view of an exemplary syntactic tree of an English message.

FIG. 11a shows an example of the syntactic tree of an English message. Although the drawing is the same as FIG. 8, the drawing is presented again to compare the drawing with FIG. 11b.

Figure 11B:
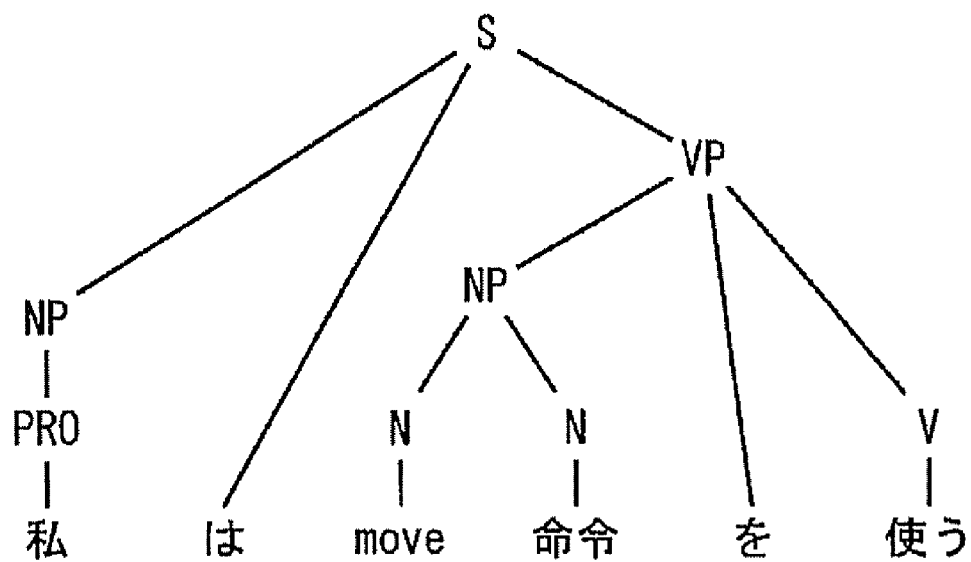
FIG. 11b is a schematic view of an exemplary syntactic tree of a Japanese message.

FIG. 11b shows an example of the syntactic tree of a Japanese message. The bottom line shows the corresponding Japanese message. It is assumed that the information of parts of speech shown in the second line from the bottom has been obtained by morphological analysis. That is to say, "Watashi" (a Japanese letter string meaning "I") is a pronoun (PRO: pronoun), "Tsukau" (a Japanese letter string meaning "use") is a verb (V: verb), and "move" and "Meirei" (a Japanese letter string meaning "command") are nouns (N: noun). The information of other parts can be obtained by parsing. That is to say, "move" and "Meirei" (a Japanese letter string meaning "command") constitute a noun phrase (NP: Noun Phrase), and the noun phrase, a postpositional particle "Wo" (a Japanese letter string), and "Tsukau" (a Japanese letter string meaning "use") constitute a verb phrase (VP: Verb Phrase). Moreover, a noun phrase that includes only "Watashi" (a Japanese letter string meaning "I") that is a pronoun and the verb phrase constitute a sentence (S: sentence).

The transfer rules shown in FIGS. 10a and 10b are applied to the syntactic tree of the English message shown in FIG. 11a. Then, the syntactic tree shown in FIG. 11a is transformed into a syntactic tree having the structure of Japanese, with the words being represented in English. As a result, the structures of the two syntactic trees to be compared match each other. The process after the structures of the syntactic trees match each other is as described in FIG. 9. The determining unit 520 can locate subtrees that match each other out of the syntactic tree of a translation source language and the syntactic tree of a translation target language by using predetermined transfer rules between the languages, as described above with reference to FIGS. 9 to 11. The description of the case where English and Japanese are applied as the first and second languages is completed here, and the case where English and German are used as the first and second languages is considered.

Returning to FIG. 6, the translation unit 530 reads the third message (may be the same as the first message or the second message) from the message storage unit 20 and generates the fourth message by translating the third message by the operation of the CPU 1000 (S670). In this process, when a phrase that need not be translated is included in the third message, the translation unit 530 puts the phrase, as represented in the third message, in the fourth message after the translation and generates the fourth message. Moreover, in this translation process, it is preferable that the translation unit 530 perform the following processes to improve the accuracy of translation.

Handling Compound Words

Parsing of a message is performed in a translation process. In this case, when a phrase that need not be translated is a compound word, the accuracy of translation can be further improved by using information in parsing, the information indicating that the phrase need not be translated. Specifically, the translation unit 530 first determines whether the translation unit 530 has detected a compound word including a phrase that need not be translated in the third message. A compound word may be detected in a syntactic tree as a subtree that includes more than one word or may include only more than one word that is successive in the representation of the message and need not be translated.

On the condition that the translation unit 530 has detected such a compound word, in the process of translating the third message into the fourth message, the translation unit 530 analyzes the syntactical relationships between the compound word and the other words without analyzing the syntactical relationships between words included in the compound word. Then, the translation unit 530 puts the compound word in the fourth message after the translation and outputs the compound word, as represented in the third message. An example of such a compound word is shown in FIG. 12.

FIG. 12 shows a specific example of a compound word that need not be translated. The first message in English and the second message in German are shown in the first line and the second line, respectively. Regarding a compound word "Everyplace Access", since the representations in English and German match each other and are represented as subtrees corresponding to each other in the syntactic trees, the compound word is determined as being a phrase that need not be translated. In such a case, the translation unit 530 does not analyze the syntactical relationship between "Everyplace" and "Access". That is to say, the relationship is actually that between an adverb and a noun (or a verb), and thus the syntactical relationship can be determined. However, the translation unit 530 handles these words as a single phrase and analyzes the syntactical relationships between this phrase and the other phrases. As a result, it is determined that this phrase is a noun phrase and, together with another verb phrase, constitutes a sentence. Accordingly, the number of errors in parsing decreases, and the accuracy of translation can be improved.

Elimination of Ambiguity

In the process of generating the fourth message by translating the third message, when a certain phrase in the third language included in the third message is stored in association with a plurality of semantic attributes, the translation unit 530 determines whether the translation of the phrase in the third language in the fourth language varies with the semantic attribute corresponding to the representation of the phrase in the third language. Examples are shown in FIGS. 13a and 13b.

FIG. 13a shows specific examples of semantic attributes of English. FIG. 13b shows specific examples of semantic attributes of German. The attribute storage unit 540 stores an English word "command" in the third language in association with a plurality of semantic attributes. The English word is in association with, for example, a semantic attribute representing an 'act' and a semantic attribute representing a 'state'. Translations in Japanese corresponding to the semantic attributes are "Meirei" (a Japanese letter string meaning "command" having a semantic attribute representing an 'act') and "Miharashi" (a Japanese letter string meaning "command" having a semantic attribute representing a 'state'). Such determination can be made by determining translations of the English word "command" in Japanese with reference to a dictionary for translation between English and Japanese and then determining semantic attributes corresponding to the translations with reference to semantic attributes of Japanese stored in the attribute storage unit 540. In such a case, the translation unit 530 determines that the translation varies with the semantic attribute.

In this case, the translation unit 530 searches for a subtree out of the first syntactic tree or the second syntactic tree, the subtree corresponding to a subtree representing this phrase in the third language in a third syntactic tree generated to translate the third message. In the case shown in FIG. 13a, the first syntactic tree is the same as the third syntactic tree. Thus, the second syntactic tree is subjected to the search. In the case of German, a word "Befehl" is located. Then, the translation unit 530 reads at least one semantic attribute of the phrase corresponding to the located subtree from the attribute storage unit 540. The read semantic attribute is an 'act'. Then, the translation unit 530 calculates the intersection of the read semantic attribute and the semantic attributes of the phrase in the third language and outputs a translation corresponding to a semantic attribute included in the intersection, the translation being put in the fourth message. Thus, the translation to be output is "Meirei" (a Japanese letter string meaning "command" having a semantic attribute representing an 'act'). Similar examples are shown in FIG. 14.

FIG. 14a shows specific examples of semantic attributes of an English word "case". Translations of the English word "case" in Japanese are "Jirei" (a Japanese letter string meaning "case" having a semantic attribute representing an 'abstract') and "Hako" (a Japanese letter string meaning "case" having a semantic attribute representing an 'artifact'). The semantic attributes are an 'abstract' and an 'artifact'. However, the representations of "Jirei" (a Japanese letter string meaning "case" having a semantic attribute representing an 'abstract') and "Hako" (a Japanese letter string meaning "case" having a semantic attribute representing an 'artifact') in German are different. Thus, the translation unit 530 can accurately determine a translation by comparing an English message with a German message.

FIG. 14b shows specific examples of semantic attributes of an English word "table". Translations of the English word "table" in Japanese are "Hyou" (a Japanese letter string meaning "table" having a semantic attribute representing a 'language') and "table" (a Japanese letter string meaning "table" having a semantic attribute representing an 'artifact'). The semantic attributes are a 'language' and an 'artifact'. However, the representations of "Hyou" (a Japanese letter string meaning "table" having a semantic attribute representing a 'language') and "table" (a Japanese letter string meaning "table" having a semantic attribute representing an 'artifact') in German are different. Thus, the translation unit 530 can accurately determine a translation by comparing an English message with a German message.

FIG. 14c shows specific examples of semantic attributes of an English word "plant". Translations of the English word "plant" in Japanese are "Shokubutsu" (a Japanese letter string meaning "plant" having a semantic attribute representing a 'plant') and "Koujou" (a Japanese letter string meaning "plant" having a semantic attribute representing a 'place'). The semantic attributes are a 'plant' and a 'place'. However, the representations of "Shokubutsu" (a Japanese letter string meaning "plant" having a semantic attribute representing a 'plant') and "Koujou" (a Japanese letter string meaning "plant" having a semantic attribute representing a 'place') in German are different. Thus, the translation unit 530 can accurately determine a translation by comparing an English message with a German message.

Ambiguity may not be eliminated with English and German. Such an example is shown in FIG. 14d.

FIG. 14d shows specific examples of semantic attributes of an English word "right". Translations of the English word "right" in Japanese are "Migi" (a Japanese letter string meaning "right" having a semantic attribute representing a 'place') and "Kenri" (a Japanese letter string meaning "right" having a semantic attribute representing a 'law'). The semantic attributes are a 'place' and a 'law'. The representations of "Migi" (a Japanese letter string meaning "right" having a semantic attribute representing a 'place') and "Kenri" (a Japanese letter string meaning "right" having a semantic attribute representing a 'law') in German are "Recht" and are the same. Thus, ambiguity cannot be eliminated with English and German. In such a case, ambiguity can be eliminated by using, for example, translations in Chinese. Processes in which it is assumed that more than two languages exist in this way will now be additionally described.

A first process is that in which, when messages in more than two languages are stored, a translation is determined by majority rule to further improve the accuracy of translation. That is, the parsing unit 500 generates syntactic trees for messages in all of the languages. Then, when the translation unit 530 determines that the translation varies with the semantic attribute, the translation unit 530 locates subtrees in the individual syntactic trees, the subtrees corresponding to a subtree representing a phrase in the third language in the third syntactic tree. Then, the translation unit 530 reads all semantic attributes of a phrase corresponding to each of the located subtrees from the attribute storage unit 540 and outputs a translation corresponding to a semantic attribute that has been read in association with the most phrases, the translation being put in the fourth message. The determination may be made using a semantic attribute in association with phrases, the proportion of the phrases being higher than a predetermined reference proportion, out of all read phrases instead of using a semantic attribute in association with the most phrases.

A second process is that in which a language that is used to eliminate ambiguity is appropriately selected. That is, priorities given to languages that are used in translation are predetermined. For example, the order of priorities is as follows: English, Chinese, German, and so on. The translation unit 530 selects the first language or the second language in the order of priorities from a plurality of languages in which messages stored in the message storage unit 20 are described. For example, when English comes first, English is first selected. When no English message is prepared, Chinese is selected. Then, the translation unit 530 locates a subtree in a syntactic tree obtained by parsing a message in the selected language, the subtree corresponding to a subtree representing a phrase in the third language in the third message to be translated, and reads at least one semantic attribute of a phrase corresponding to the located subtree from the attribute storage unit 540. Then, the translation unit 530 calculates the intersection of the read semantic attribute and semantic attributes of the phrase in the third language and outputs a translation corresponding to a semantic attribute included in the intersection, the translation being put in the fourth message.

A third process is that in which a language that is used to eliminate ambiguity is selected depending on the group to which a language belongs. That is, the language storage unit 510 stores languages classified into groups, as described in FIG. 5. Then, the translation unit 530 selects one of the first and second languages, in which messages stored in the message storage unit 20 are described, which is classified into a group that is different from a group to which the third language belongs. For example, in a case where the third language to be translated is English, when the first and second languages are German and Chinese, respectively, German belonging to the same group as English is not selected, and Chinese belonging to a group that is different from a group to which English belongs is selected. Then, the translation unit 530 locates a subtree in a syntactic tree obtained by parsing a message in the selected language, the subtree corresponding to a subtree representing a phrase in the third language, reads at least one semantic attribute of a phrase corresponding to the located subtree from the attribute storage unit 540, calculates the intersection of the read semantic attribute and semantic attributes of the phrase in the third language, and outputs a translation corresponding to a semantic attribute included in the intersection, the translation being put in the fourth message. In this arrangement, a phrase in a subtree corresponding to a subtree representing a polysemic word can be prevented from being a polysemic word, so that the probability that ambiguity is eliminated can be increased. That is to say, although the ambiguity of a word "right" cannot be eliminated by comparing corresponding translations between English and German that are European languages because the etymologies of the translations are the same, as seen in FIG. 14d, the probability that ambiguity is eliminated can be increased by comparing corresponding translations between English and Chinese belonging to a group that is different from a group to which English belongs.

Selection of Translation Engine

In a case where a plurality of messages in a plurality of languages are stored in the message storage unit 20, when a language as similar to the target fourth language (for example, Japanese) as possible is selected as the third language, the accuracy of translation is apt to be high. Thus, it is preferable that a translation engine, i.e., the type of translation corresponding to a pair of a translation source language and a translation target language, be appropriately selected. For example, for each language, priorities are predetermined among other languages on the basis of similarities between each language and the other languages. For example, in the case of Japanese, the order of priorities is as follows: Korean, Chinese, and so on. The translation unit 530 selects, as the third language, a language, to which the highest priority is assigned, from languages of messages stored in the message storage unit 20 in the order of priorities in association with the target fourth language. For example, when a message in Korean is stored, Korean is selected. When no message in Korean is stored, Chinese is selected. Then, the translation unit 530 generates the fourth message by translating a message described in the selected language. Thus, the accuracy of translation can be further improved.

Returning to FIG. 6, the translation unit 530 outputs the fourth message having been subjected to the translation to the user (S680). Even a short message such as an error message can be appropriately translated by the aforementioned various functions so that the message can be understood.

Figure 15:
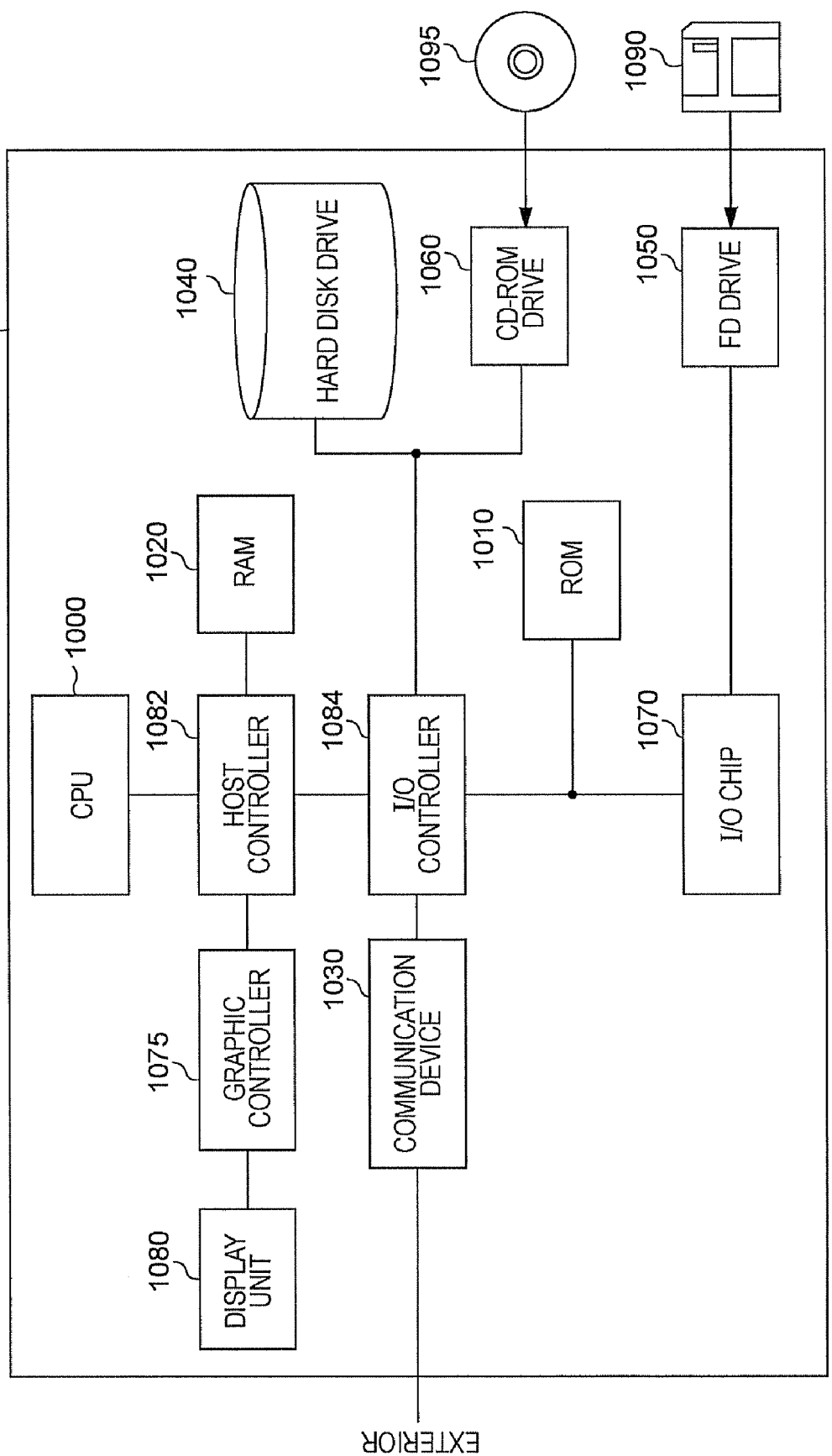
FIG. 15 is a schematic view of an exemplary hardware configuration of an information processing unit 1500 functioning as the information system 10, according to an embodiment of the invention.

FIG. 15 shows an exemplary hardware configuration of an information processing unit 1500 functioning as the information system 10. The information processing unit 1500 includes a CPU peripheral section that includes the CPU 1000, the RAM 1020, and a graphic controller 1075 that are connected to each other via a host controller 1082, an input-output section that includes a communication interface 1030, a hard disk drive 1040, and a CD-ROM drive 1060 that are connected to the host controller 1082 via an input-output controller 1084, and a legacy input-output section that includes a ROM 1010, a flexible disk drive 1050, and an input-output chip 1070 that are connected to the input-output controller 1084.

The host controller 1082 connects the RAM 1020 to the CPU 1000 and the graphic controller 1075, which access the RAM 1020 at a high transfer rate. The CPU 1000 operates according to computer programs stored in the ROM 1010 and the RAM 1020 and controls individual components. The graphic controller 1075 obtains image data generated in a frame buffer provided in the RAM 1020 by the CPU 1000 and the like and displays the image data on a display unit 1080. Instead of this arrangement, the graphic controller 1075 may include the frame buffer, which stores image data generated by the CPU 1000 and the like.

The input-output controller 1084 connects the host controller 1082 to the communication interface 1030, the hard disk drive 1040, and the CD-ROM drive 1060, which are relatively high-speed input-output units. The communication interface 1030 communicates with external devices via networks. The hard disk drive 1040 stores computer programs and data used by the information processing unit 1500. The CD-ROM drive 1060 reads computer programs or data from the CD-ROM 1095 and supplies the programs or data to the RAM 1020 or the hard disk drive 1040.

Moreover, the ROM 1010, the flexible disk drive 1050, the input-output chip 1070, and the like, which are relatively low-speed input-output units, are connected to the input-output controller 1084. The ROM 1010 stores a boot program executed by the CPU 1000 when the information processing unit 1500 is activated, programs that depend on the hardware of the information processing unit 1500, and the like. The flexible disk drive 1050 reads programs or data from a flexible disk 1090 and supplies the programs or data to the RAM 1020 or the hard disk drive 1040 via the input-output chip 1070. The input-output chip 1070 enables connection of the flexible disk 1090, various types of input-output unit via, for example, a parallel port, a serial port, a keyboard port, and a mouse port, and the like.

Programs provided to the information processing unit 1500 are stored in a recording medium, such as the flexible disk 1090, the CD-ROM 1095, or an IC card, and provided by the user. The programs are read from the recording medium via the input-output chip 1070 and/or the input-output controller 1084, and installed and executed in the information processing unit 1500. Operations performed by the information processing unit 1500 and the like driven by the programs are the same as the operations in the information system 10 described in FIGS. 1 to 14, and thus the description of the operations is omitted.

The aforementioned programs may be stored in an external storage medium. In addition to the flexible disk 1090 and the CD-ROM 1095, an optical recording medium such as a DVD or a PD, a magneto-optical recording medium such as an MD, a tape medium, a semiconductor memory such as an IC card, or the like can be used as the storage medium. Moreover, the programs may be provided to the information processing unit 1500 via networks using, as the recording medium, a storage unit, such as a hard disk or a RAM, provided in a server system connected to a private communication network, the Internet, or the like.

In the information system 10 shown in the embodiment, the accuracy of machine translation can be improved using a plurality of messages in which the same content is described in a plurality of languages. This is effective in a system, such as Linux (registered trademark), having a function of selectively outputting messages in a plurality of languages because all messages need not be manually translated and prepared in advance.

While the present invention has been described via the embodiment, the technical scope of the present invention is not limited to the scope described in the foregoing embodiment. It will be readily apparent to those skilled in the art that various changes or improvements can be made in the foregoing embodiment. For example, such a translation process can be applied to not only error messages but also other general sentences when translation texts in a plurality of languages are prepared in advance. It is apparent from the description in the claims that the embodiment that is changed or improved may be included in the technical scope of the present invention.

The invention claimed is:

1. A system for translating messages, the system comprising:
   a message storage unit for storing a first message, a second message, and a third message, wherein the same content is respectively described in the first message and the second message in a first language and a second language that are different from each other;
   a parsing unit for generating a first syntactic tree that represents a hierarchical structure of words and phrases included in the first message and a second syntactic tree that represents a hierarchical structure of words and phrases included in the second message by an operation of a CPU, by reading the first and second messages from the message storage unit and parsing the first and second messages;
   a determining unit for determining, the operation of the CPU, whether a representation of a phrase represented by a certain subtree included in the first syntactic tree matches a representation of a phrase represented by a subtree, corresponding to the certain subtree, in the second syntactic tree, and, on the condition that the representations match each other, determining that the phrase is a phrase that need not be translated; and
   a translation unit for outputting, in a process of generating a fourth message described in a fourth language by translating a third message described in a third language by the operation of the CPU, the phrase that need not be translated and is included in the third message, as represented in the third message, the phrase being put in the fourth message after the translation.

2. The system according to claim 1, wherein, on the condition that a compound word that includes the phrase that need not be translated has been located in the third message, in a process of parsing the third message to translate the third message to generate the fourth message, the translation unit analyzes syntactical relationships between the compound word and the other words without analyzing syntactical relationships between words included in the compound word, translates the third message excluding the compound word on the basis of the syntactical relationships, and outputs the compound word, as represented in the third message, the compound word being put in the fourth message after the translation.

3. The system according to claim 1, further comprising an attribute storage unit for storing, for each language, individual representations of a plurality of words in each language in association with semantic attributes about individual meanings of the words;
   wherein a semantic attribute indicates which one of the groups, into which meanings of words are classified according to abstraction of each of the meanings, a meaning of a word belongs to;

wherein the translation unit, on the condition that a translated phrase in the fourth language from a phrase in the third language included in the third message, varies with a semantic attribute corresponding to a representation of the phrase in the third language, locates a subtree in the first or second syntactic tree, the subtree corresponding to a subtree representing the phrase in the third language in a third syntactic tree obtained by parsing the third message, reads at least one semantic attribute of a phrase corresponding to the located subtree from the attribute storage unit, calculates an intersection of the read semantic attribute and semantic attributes of the phrase in the third language, and outputs a translated phrase corresponding to a semantic attribute included in the intersection, the translated phrase being put in the fourth message.

4. The system according to claim 3, wherein the message storage unit stores a plurality of messages in which the same content is described in a plurality of languages that are different from each other, the languages including the first language and the second language;

wherein the parsing unit reads the plurality of messages from the message storage unit and generates a plurality of syntactic trees by parsing each of the plurality of messages; and wherein the translation unit, on the condition that a translated phrase in the fourth language from a phrase in the third language included in the third message, varies with a semantic attribute corresponding to a representation of the phrase in the third language, locates a subtree in each of the plurality of generated syntactic trees, the subtree corresponding to a subtree representing the phrase in the third language in the third syntactic tree obtained by parsing the third message, reads all semantic attributes of a phrase corresponding to each of the located subtrees from the attribute storage unit, and outputs a translated phrase corresponding to a semantic attribute that has been read in association with the most phrases, the translated phrase being put in the fourth message.

5. The system according to claim 3, wherein the translation unit selects the first language or the second language in an order of priorities that is predetermined for languages that are used in translation, locates a subtree in a syntactic tree obtained by parsing a message in the selected language, the subtree corresponding to a subtree representing the phrase in the third language, reads at least one semantic attribute of a phrase corresponding to the located subtree from the attribute storage unit, calculates an intersection of the read semantic attribute and semantic attributes of the phrase in the third language, and outputs a translated phrase corresponding to a semantic attribute included in the intersection, the translated phrase being put in the fourth message.

6. The system according to claim 3, further comprising a language storage unit for storing languages classified into groups;

wherein the translation unit selects one of the first and second languages, which is classified into a group that is different from a group to which the third language belongs, locates a subtree in a syntactic tree obtained by parsing a message in the selected language, the subtree corresponding to a subtree representing the phrase in the third language, reads at least one semantic attribute of a phrase corresponding to the located subtree from the attribute storage unit, calculates an intersection of the read semantic attribute and semantic attributes of the phrase in the third language, and outputs a translated phrase corresponding to a semantic attribute included in the intersection, the translated phrase being put in the fourth message.

7. The system according to claim 1, wherein the message storage unit stores a plurality of messages in which the same content is described in a plurality of languages that are different from each other; and wherein the translation unit selects, as the third language, a language, to which the highest priority is assigned, from languages of messages stored in the message storage unit in an order of priorities in association with the fourth language, and generates the fourth message described in the fourth language by translating the third message described in the third language.

8. The system according to claim 1, wherein the message storage unit stores each piece of identification information of a result of processing a command in association with a message indicating the result of processing the command and a language in which the message is described; and wherein the parsing unit, in response to a request to output a message indicating a result of processing a command in the fourth language, retrieves the fourth message corresponding to the fourth language and identification information of the result of the processing from the message storage unit, searches for a plurality of messages corresponding to a plurality of languages different from the fourth language out of the message storage unit as the first and second messages on the condition that the fourth message has not been successfully retrieved, and parses each of the searched first and second messages.

9. A method for translating messages, the method comprising:

storing, in a message storage unit, a first message, a second message, and a third message, wherein the same content is respectively described in the first message and the second message in a first language and a second language that are different from each other;

generating a first syntactic tree that represents a hierarchical structure of words and phrases included in the first message and a second syntactic tree that represents a hierarchical structure of words and phrases included in the second message by an operation of a CPU, by reading the first and second messages from the message storage unit and parsing the first and second messages;

determining by the operation of the CPU whether a representation of a phrase represented by a certain subtree included in the first syntactic tree matches a representation of a phrase represented by a subtree, corresponding to the certain subtree, in the second syntactic tree, and, on the condition that the representations match each other, determining that the phrase is a phrase that need not be translated; and outputting, in a process of generating a fourth message described in a fourth language by translating a third message described in a third language by the operation of the CPU, the phrase that need not be translated and is included in the third message, as represented in the third message, the phrase being put in the fourth message after the translation.

10. The method of claim 9, wherein, if a compound word includes the phrase that need not be translated has been located in the third message, in a process of parsing the third message to translate the third message to generate the fourth message, the method further comprises analyzing syntactical relationships between the compound word and the other words without analyzing syntactical relationships between words included in the compound word, translating the third message excluding the compound word on the basis of the syntactical relationships, and outputting the compound word, as represented in the third message, the compound word being put in the fourth message after the translation.

11. The method of claim 9, wherein the storing step comprises storing, for each language, individual representations of a plurality of words in each language in association with semantic attributes about individual meanings of the words;
   wherein a semantic attribute indicates which one of the groups, into which meanings of words are classified according to abstraction of each of the meanings, a meaning of a word belongs to; and
   wherein, on the condition that a translated phrase in the fourth language from a phrase in the third language included in the third message, varies with a semantic attribute corresponding to a representation of the phrase in the third language, the method further comprises locating a subtree in the first or second syntactic tree, the subtree corresponding to a subtree representing the phrase in the third language in a third syntactic tree obtained by parsing the third message, reading at least one semantic attribute of a phrase corresponding to the located subtree from the attribute storage unit, calculates an intersection of the read semantic attribute and semantic attributes of the phrase in the third language, and outputting a translated phrase corresponding to a semantic attribute included in the intersection, the translated phrase being put in the fourth message.

12. The method of claim 11, wherein the storing step comprises storing a plurality of messages in which the same content is described in a plurality of languages that are different from each other, the languages including the first language and the second language;
   wherein reading comprises reading the plurality of messages and generating a plurality of syntactic trees by parsing each of the plurality of messages; and
   further comprising, on the condition that a translated phrase in the fourth language from a phrase in the third language included in the third message, varies with a semantic attribute corresponding to a representation of the phrase in the third language, locating a subtree in each of the plurality of generated syntactic trees, the subtree corresponding to a subtree representing the phrase in the third language in the third syntactic tree obtained by parsing the third message, reading all semantic attributes of a phrase corresponding to each of the located subtrees from the attribute storage unit, and outputting a translated phrase corresponding to a semantic attribute that has been read in association with the most phrases, the translated phrase being put in the fourth message.

13. The method of claim 11, further comprising selecting the first language or the second language in an order of priorities that is predetermined for languages that are used in translation, locating a subtree in a syntactic tree obtained by parsing a message in the selected language, the subtree corresponding to a subtree representing the phrase in the third language, reading at least one semantic attribute of a phrase corresponding to the located subtree from the attribute storage unit, calculating an intersection of the read semantic attribute and semantic attributes of the phrase in the third language, and outputting a translated phrase corresponding to a semantic attribute included in the intersection, the translated phrase being put in the fourth message.

14. The method of claim 11, further comprising storing languages classified into groups;
selecting one of the first and second languages, which is classified into a group that is different from a group to which the third language belongs, locating a subtree in a syntactic tree obtained by parsing a message in the selected language, the subtree corresponding to a subtree representing the phrase in the third language, reading at least one semantic attribute of a phrase corresponding to the located subtree from the attribute storage unit, calculating an intersection of the read semantic attribute and semantic attributes of the phrase in the third language, and outputting a translated phrase corresponding to a semantic attribute included in the intersection, the translated phrase being put in the fourth message.

15. The method of claim 9, wherein the storing step comprises storing a plurality of messages in which the same content is described in a plurality of languages that are different from each other; and
   further comprising selecting, as the third language, a language, to which the highest priority is assigned, from languages of messages stored in the message storage unit in an order of priorities in association with the fourth language, and generates the fourth message described in the fourth language by translating the third message described in the third language.

16. The method of claim 9, wherein the storing step comprises storing each piece of identification information of a result of processing a command in association with a message indicating the result of processing the command and a language in which the message is described; and
   further comprising, in response to a request to output a message indicating a result of processing a command in the fourth language, retrieving the fourth message corresponding to the fourth language and identification information of the result of the processing from the message storage unit, searching for a plurality of messages corresponding to a plurality of languages different from the fourth language out of the message storage unit as the first and second messages on the condition that the fourth message has not been successfully retrieved, and parsing each of the searched first and second messages.

17. A non-transitory computer readable medium having embedded therein computer-readable code that causes an information processing unit to function as a system for translating messages, the embedded code causing the information processing unit to function as:
   a message storage unit for storing a first message, a second message, and a third message, wherein the same content is respectively described in the first message and the second message in a first language and a second language that are different from each other;
   a parsing unit for generating a first syntactic tree that represents a hierarchical structure of words and phrases included in the first message and a second syntactic tree that represents a hierarchical structure of words and phrases included in the second message by an operation of a CPU, by reading the first and second messages from the message storage unit and parsing the first and second messages;
   a determining unit for determining, by the operation of the CPU, whether a representation of a phrase represented by a certain subtree included in the first syntactic tree matches a representation of a phrase represented by a subtree, corresponding to the certain subtree, in the second syntactic tree, and, on the condition that the representations match each other, determining that the phrase is a phrase that need not be translated; and a translation unit for outputting, in a process of generating a fourth message described in a fourth language by translating a third message described in a third language by the operation of the CPU, the phrase that need not be translated and is included in the third message, as represented in the third message, the phrase being put in the fourth message after the translation.

* * * * *